(12) United States Patent
Matsuura et al.

(10) Patent No.: US 8,148,950 B2
(45) Date of Patent: Apr. 3, 2012

(54) CHARGING METHOD

(75) Inventors: Shinichi Matsuura, Hyogo (JP);
Atsushi Kawasumi, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 701 days.

(21) Appl. No.: 12/314,483

(22) Filed: Dec. 11, 2008

(65) Prior Publication Data

US 2009/0153104 A1 Jun. 18, 2009

(30) Foreign Application Priority Data

Dec. 12, 2007 (JP) ................................. 2007-321374

(51) Int. Cl.
*H02J 7/04* (2006.01)
*H02J 7/16* (2006.01)
*H02J 7/00* (2006.01)

(52) U.S. Cl. ........ 320/150; 320/153; 320/128; 320/132; 320/136; 320/144

(58) Field of Classification Search .................... 320/150
See application file for complete search history.

(56) References Cited

U.S. PATENT DOCUMENTS

| 6,033,109 | A * | 3/2000 | Huang | 374/183 |
| 7,622,896 | B2 * | 11/2009 | Nakagawa | 320/150 |
| 2006/0220620 | A1 * | 10/2006 | Aradachi et al. | 320/150 |
| 2007/0120554 | A1 * | 5/2007 | Kawakami et al. | 324/133 |

FOREIGN PATENT DOCUMENTS

| JP | 7-73907 | | 3/1995 |
| JP | 07073907 | A * | 3/1995 |
| JP | 7-222374 | | 8/1995 |
| JP | 2004159379 | A * | 6/2004 |

* cited by examiner

*Primary Examiner* — Edward Tso
*Assistant Examiner* — Ahmed Omar
(74) *Attorney, Agent, or Firm* — Wenderoth, Lind & Ponack, LLP

(57) ABSTRACT

A charging method includes first and second charging steps to charge a lithium-ion battery. In the first charging step, a temperature rise gradient of the battery is detected. A battery temperature when the battery is charged to a first predetermined capacity is predicted based on the detected gradient. A charging current is controlled based on the predicted temperature. The battery is charged, at a current that results in a battery temperature that is lower than a predetermined temperature, to the first predetermined capacity. In the second charging step, a temperature rise gradient of the battery is detected. A battery temperature when the battery is charged to a second predetermined capacity is predicted based on the gradient. A charging current is controlled based on the predicted temperature. The battery is charged, at a current that results in a temperature of the battery that is lower than the predetermined temperature, to the second predetermined capacity.

13 Claims, 6 Drawing Sheets

CHARGING METHOD

BACKGROUND OF THE INVENTION

1. Field of the Invention

The present invention relates to a lithium-ion rechargeable battery charging method, and in particular to a charging method that detects a temperature of a battery and controls a charging current based on the detected temperature. In this specification, a "lithium-ion rechargeable battery" is used in a sense that includes a lithium-polymer battery.

2. Description of the Related Art

In order to improve safety, a charging current and a charging voltage of lithium-ion rechargeable batteries are controlled according to a temperature of the lithium-ion rechargeable batteries. FIG. 1 shows an exemplary relationship of a charging current and a maximum voltage to a temperature of the lithium-ion rechargeable battery. As shown in this figure, a voltage and a current of the lithium-ion rechargeable battery are set high in a normal temperature range, but both charging voltage and current of lithium-ion rechargeable battery are set low in high and low temperature ranges. For this reason, if a temperature of a battery rises to the high temperature range in a charging operation, a charging voltage is reduced, and as a result the battery cannot be fully charged. In a conventional constant-current and constant-voltage charging operation of a lithium ion battery, in particular, at the start of a charging operation, in the case where a temperature of the battery is high, for example, as shown in FIG. 1, if a battery temperature rises from the normal temperature range to the high temperature range, charging voltage and current in the high temperature range are lower than in the normal temperature range. For this reason, there are problems in that the completed charged amount of the battery is low, or charging operation time is long. In the case of a charging circuit that cannot reduce a charging voltage, there is a problem in that the charging circuit stops the charging operation and as a result the completed charged amount of the battery is low.

A method has been developed which prevents the temperature of a charged battery from rising too high. This method is disclosed in Japanese Laid-Open Patent Publication No. H07-73907-A (1995). In this method, a temperature of a nickel-hydrogen battery is held in a range of 10° C. to 40° C. in a charging operation. In addition to this, in this charging method, a battery temperature rise value $\Delta T$ is measured, and a battery temperature at charging operation completion is predicted based on a battery temperature T and a value $\Delta T/\Delta t$. If it is determined that the predicted battery temperature will exceed 40° C., the battery is cooled.

Also, a method has been developed which detects a temperature of a battery and controls a charging current. This method is disclosed in Japanese Laid-Open Patent Publication No. H07-222374-A (1995). This method also charges a nickel-hydrogen battery. A temperature rise gradient is detected, and a temperature is predicted based on the detected temperature rise gradient. Accordingly, a charging Current is controlled based on the predicted temperature.

SUMMARY OF THE INVENTION

The charging method in Japanese Laid-Open Patent Publication No. H07-73907-A (1995) requires a mechanism that forcedly cools the battery. For this reason, there is a disadvantage in that manufacturing costs are high. Also, since the battery is cooled by forcedly blowing air, there is a disadvantage in that the noise level of a fan or the like that cools the battery increases. Additionally, since mechanical parts such as the fan are likely to develop trouble, as compared with electronic circuits, there is the disadvantage that trouble is likely to occur. Also, in the charging method in Japanese Laid-Open Patent Publication No. H07-222374-A (1995), although a temperature of the charged battery can be low by controlling a charging current based on a temperature rise gradient, in the case where lithium-ion rechargeable batteries are charged in accordance with this method, there is the disadvantage that the time to fully charge the batteries remarkably increases.

The present invention has been developed for solving the aforementioned disadvantages. It is an important object of the present invention to provide a charging method that can prevent temperature rise of a lithium-ion rechargeable battery even in the state where the battery is not forcedly cooled, and can fully charge the battery in a short time.

A charging method according to the present invention is a constant-voltage and constant-current lithium-ion rechargeable battery charging method that includes first and second charging steps, and charges a lithium-ion rechargeable battery by using the first and second charging steps. In the first charging step, at a current that is currently applied to a battery to be charged, a temperature rise gradient of the battery is detected. A battery temperature when the battery will be charged to a first predetermined capacity is predicted based on the detected temperature rise gradient. A charging current is controlled based on the predicted temperature. The battery is charged, at a current that brings a temperature of the battery lower than a predetermined temperature, to the first predetermined capacity. In the second charging step, after the battery is charged to the first predetermined capacity, a temperature rise gradient of the battery is detected at a current that is currently applied to the battery to be charged. A battery temperature when the battery will be charged to a second predetermined capacity is predicted based on the temperature rise gradient. A charging current is controlled based on the predicted temperature. The battery is charged, at a current that results in a lower temperature of the battery in relation to the predetermined temperature, to the second predetermined capacity.

The aforementioned charging method has an advantage in that temperature rise of a lithium-ion rechargeable battery can be prevented without forcedly cooling the battery, and the battery can be fully charged in a short time. The reason is that, according to the aforementioned charging method, a battery is charged in the first charging step, in that, at a current that is applied to a battery to be charged, a temperature rise gradient of a battery at a charging current is detected, in that a battery temperature when the battery will be charged to a first predetermined capacity is predicted based on the predicted temperature rise gradient, in that a charging current is controlled based on the predicted temperature, and in that the battery is charged, at a current that results in a temperature of the battery that is lower than a predetermined temperature, to the first predetermined capacity. Then the battery is charged in the second charging step in that a temperature rise gradient of a battery at a charging current is detected at the current that is currently applied to a battery to be charged, in that a battery temperature when the battery will be charged to a second predetermined capacity is predicted based on the temperature rise gradient, in that a charging current is controlled based on the predicted temperature, and in that the battery is charged at a current that results in a temperature of the battery that is lower than at a predetermined temperature. In particular, the charging method according to the present invention has a feature in that a battery is charged to the first predetermined capacity in the first charging step, and is then charged to the second predetermined capacity in the second charging step. Since, according to the present invention, a battery is charged in a plurality of steps in that predetermined capacities are different, the battery can be fully charged in a short time.

FIG. 2 shows the state where a lithium-ion rechargeable battery is charged in the aforementioned charging method. In this figure, a curve line A shows a charging current, and a curve line B shows the variation of a temperature of the battery in this case. It can be understood from this figure that, according to the present invention, since a battery is charged so that a charging current is controlled based on a prediction temperature that is predicted based on a temperature rise gradient in the first and second charging steps, the battery is charged at a current that is high but brings a prediction temperature lower than a predetermined temperature, and as a result the battery can be charged to the first predetermined capacity in a short time. According to the present invention, therefore, the time needed to fully charge a battery can be short. In addition to this, in both the first and second charging steps, since a charging current is controlled to bring a temperature of the battery lower than the predetermined temperature, a temperature of the battery does not rise higher than the predetermined temperature.

In the aforementioned charging method, the first predetermined capacity can be a capacity in a range of 60% to 90% of the fully-charged capacity. Also, in the aforementioned charging method, the second predetermined capacity can be the fully-charged capacity, and the predetermined temperature can be a temperature in a range of 40° to 45° C.

Also, in the aforementioned charging method, in the first charge step, a charging current for charging the battery can be increased based on the detected temperature rise gradient.

Also, in the aforementioned charging method, in the first charge step, the battery can be charged at a constant current, and in the second charge step, the battery can be charged at a constant voltage.

Also, in the aforementioned charging method, in the step in that a voltage of the battery is detected, a charging current is controlled based on the detected voltage, in that, if a voltage of the battery increases to a predetermined voltage, a charging current for charging the battery is reduced, and in that, after a voltage of the battery increases to the predetermined voltage, a charging current is reduced, detection of a voltage of the battery can be stopped in a predetermined period after it is detected that a battery voltage has increased to the predetermined voltage.

Also, in the aforementioned charging method, a voltage of the battery can be detected, and a charging current can be controlled based on the detected voltage. In this case, if a voltage of the battery increases to a predetermined voltage value, a charging current for charging the battery can be reduced. Additionally, in this case, the battery can be charged at smaller one of a charging current that is controlled based on the detected voltage, and a charging current that is controlled based on the prediction temperature.

The above and further objects of the present invention as well as the features thereof will become more apparent from the following detailed description to be made in conjunction with the accompanying drawings.

DESCRIPTION OF THE PREFERRED EMBODIMENT(S)

Figure 3:
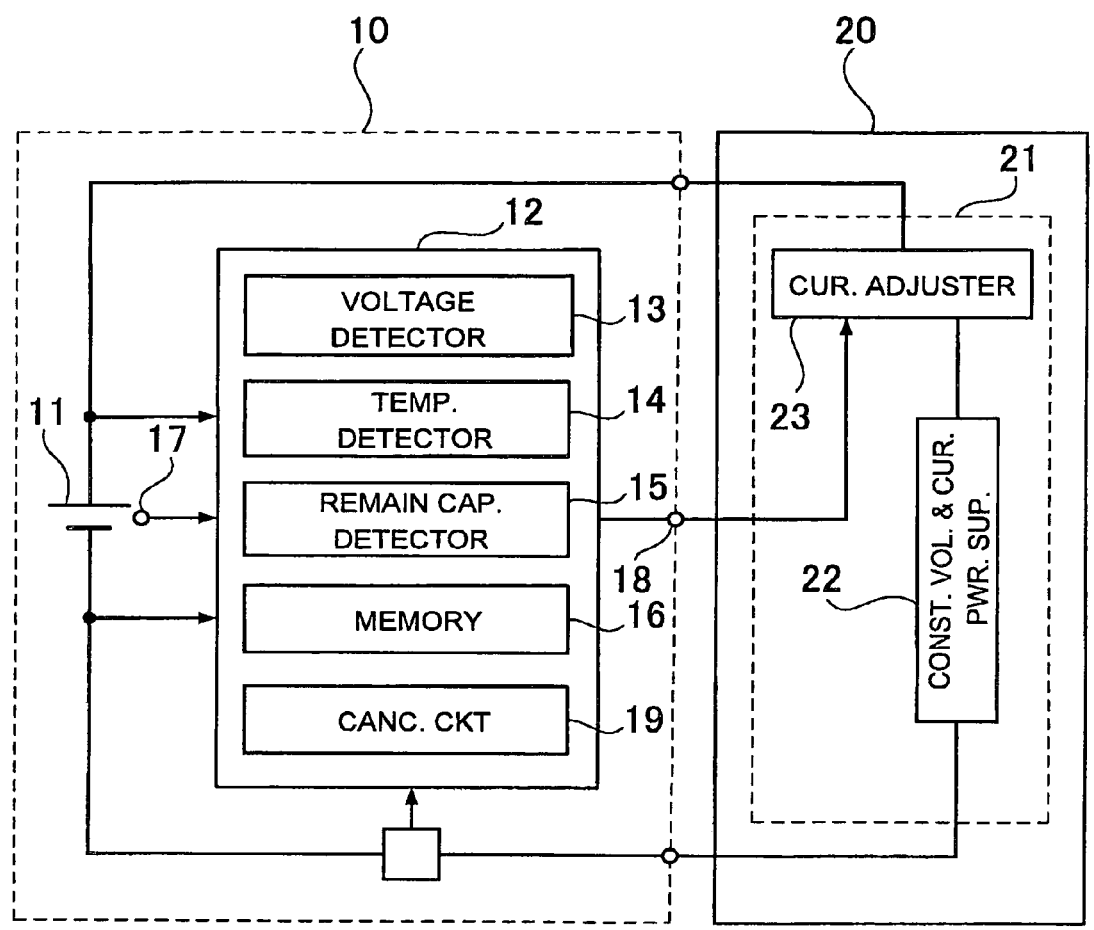
FIG. 3 is a circuit diagram showing a battery pack that is charged in the charging method according to the embodiment of the present invention.

FIG. 3 is a circuit diagram of a battery pack 10 that is charged in a charging method according to the present invention. The battery pack 10 is attached to a charger unit 20, and is charged by a charging circuit 21 of a charger unit 20. The battery pack 10 includes an arithmetic circuit 12 that detects a voltage and a temperature of a battery 11, and controls a current of the battery 11 based on the detected voltage and temperature. The battery 11 is composed of a lithium-ion rechargeable battery. The charging circuit 21 of the charger unit 20 includes a constant-voltage and constant-current power supply 22, and a current regulating circuit 23 that controls a charging current of the battery that is provided from this constant-voltage and constant-current power supply 22. The current regulating circuit 23 controls a charging current of the battery to fully charge the battery 11 based on a control signal that is provided from the arithmetic circuit 12 of the battery pack 10.

The arithmetic circuit 12 includes a voltage detecting circuit 13 that detects a voltage of the battery 11, a temperature detecting circuit 14 that detects a temperature of the battery 11, a remaining capacity detecting circuit 15 that detects a remaining capacity of the battery 11, and a memory 16 that stores predetermined voltages corresponding to temperature ranges of the battery 11.

The voltage detecting circuit 13 detects a voltage between both ends of the battery 11 to detect a battery voltage. The temperature detecting circuit 14 that detects a temperature of the battery 11 detects a battery temperature based on electrical resistance of a temperature sensor 17 that is thermally coupled to the battery 11. The remaining capacity detecting circuit 15 detects a remaining capacity based on a voltage of the battery 11 or an integrated current value and a voltage. The memory 16 stores a low-temperature predetermined voltage corresponding to a low temperature range, a normal predetermined voltage corresponding to a normal temperature range, and a high-temperature predetermined voltage corresponding to a high temperature range.

The arithmetic circuit 12 detects a temperature of the charged battery 11 to detect a temperature gradient per unit time, and predicts a battery temperature when the battery 11 will be charged to a first predetermined capacity based on the temperature gradient. A temperature of the battery at the first predetermined capacity is predicted as follows.

Battery Temperature: 15° C.
Charging Current: 0.2 C
Temperature Gradient of Charged Battery: 0.1° C./min.
Remaining Capacity of Battery in Current State: 10%
First Predetermined Capacity: 70%
Rated Capacity of Battery: 600 mAh If a battery has a remaining capacity of 10%, after an additional 60% charging operation, a remaining capacity of the battery will reach 70%. Accordingly, a charging capacity that is necessary to charge this battery to a remaining capacity of 70% is 60% of the rated capacity, i.e., 360 mAh. At 0.2 C, the charging capacity for 1 hour is 120 mAh. The charging capacity for 1 minute is 120 mAh per 60 minutes. That is, at a charging current of 0.2 C, the charging capacity of the battery for 1 minute is 2 mAh. Accordingly, at this charging capacity, it takes 180 minutes to charge a capacity of 180 mAh. The temperature gradient is 0.1° C. Accordingly, at this temperature gradient, after 180 minutes, the temperature will rise 18° C. A temperature of the battery will rise 18° C. from 15° C. Accordingly, it can be predicted that a battery temperature will be 33° C. when the battery is charged to 70% as the first predetermined capacity.

Also, the arithmetic circuit 12 detects a temperature of the charged battery 11 to detect a temperature gradient per unit time, and predicts a battery temperature when the battery 11 will be charged to a second predetermined capacity based on the temperature gradient. The temperature of the battery in the second predetermined capacity is predicted as follows.
Battery Temperature: 33° C.
Charging Current: 0.2 C
Temperature Gradient of Charged Battery: 0.1° C./min.
Remaining Capacity of Battery in Current State: 70%
Second Predetermined Capacity: 100%
Rated Capacity of Battery: 600 mAh If a battery has a remaining capacity of 70%, after an additional 30% charging operation, the remaining capacity of the battery will reach 100%. Accordingly, a charging capacity that is necessary to charge this battery to a remaining capacity of 100% is 30% of the rated capacity, i.e., 180 mAh. At 0.2 C, the charging capacity for 1 hour is 120 mAh. The charging capacity for 1 minute is 120 mAh per 60 minutes. That is, at a charging current of 0.2 C, the charging capacity of the battery for 1 minute is 2 mAh. Accordingly, at this charging capacity, it takes 90 minutes to charge a capacity of 180 mAh. The temperature gradient is 0.1° C. Accordingly, at this temperature gradient, after 90 minutes, a temperature will rise 9° C. A temperature of the battery will rise 9° C. from 33° C. Accordingly, it can be predicted that the battery temperature will be 42° C. when the battery is charged to 100% as the second predetermined capacity.

Figure 2:
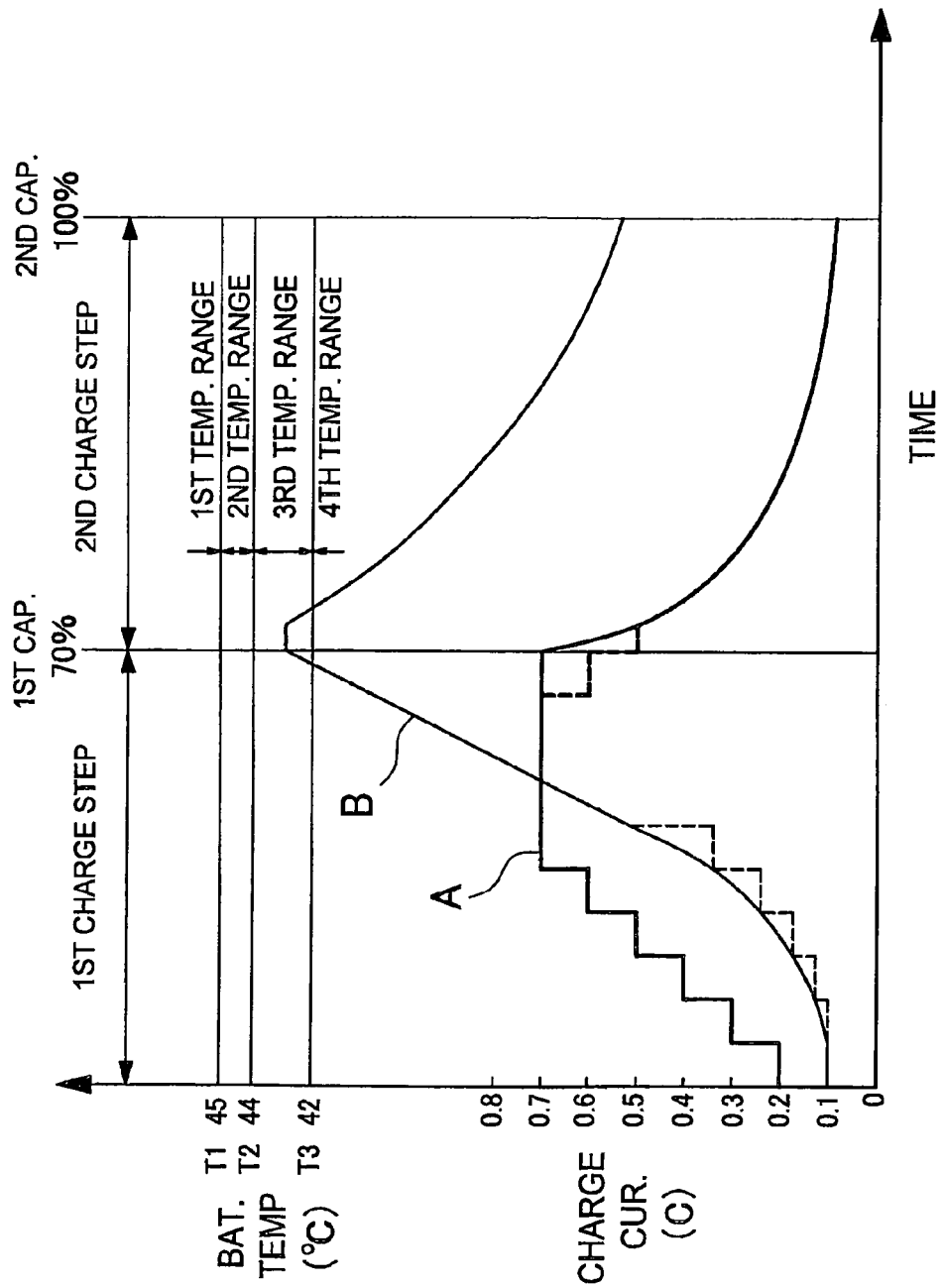
FIG. 2 is a graph showing charging current and battery temperature of a battery that is charged in a charging method according to an embodiment of the present invention.

The arithmetic circuit 12 stores the temperature ranges to control a charging current of the battery 11. For example, as shown in FIG. 2, the arithmetic circuit 12 stores a first predetermined temperature T1 (45° C. in this figure), a second predetermined temperature T2 (44° C. in this figure), and a third predetermined temperature T3 (42° C. in this figure). The arithmetic circuit 12 defines the following first to fourth temperature ranges by dividing a temperature zone by the first, second and third predetermined temperatures, and controls a charging current according to these ranges. The first temperature range is a range that is higher than the first predetermined temperature T1. The second temperature range is a range between the first predetermined temperature T1 and the second predetermined temperature T2. The third temperature range is a range between the second predetermined temperature T2 and the third predetermined temperature T3. The fourth temperature range is a range lower than the third predetermined temperature T3. If a prediction temperature of the charged battery falls within the first temperature range, a charging current is set to the minimum current. If a prediction temperature of the charged battery falls within the second temperature range, a changing current is reduced by a predetermined amount. If a prediction temperature of the charged battery falls within the third temperature range, the battery is charged without changing a charging current. If a prediction temperature of the charged battery falls within the fourth temperature range, a charging current is increased by a predetermined amount.

The aforementioned arithmetic circuit 12 controls a charging current according to the divided four temperature ranges. However, the arithmetic circuit does not necessarily control a charging current in the aforementioned manner according to the divided four temperature ranges. For example, the arithmetic circuit may have one predetermined temperature. In this case, the arithmetic circuit reduces a current if a temperature is higher than this predetermined temperature, and increases a current if a temperature is lower than the predetermined temperature. In addition to this, the arithmetic circuit may change a current value to be reduced or increased to control a charging current as the temperature difference between the predetermined temperature and a prediction temperature increases.

Figure 4:
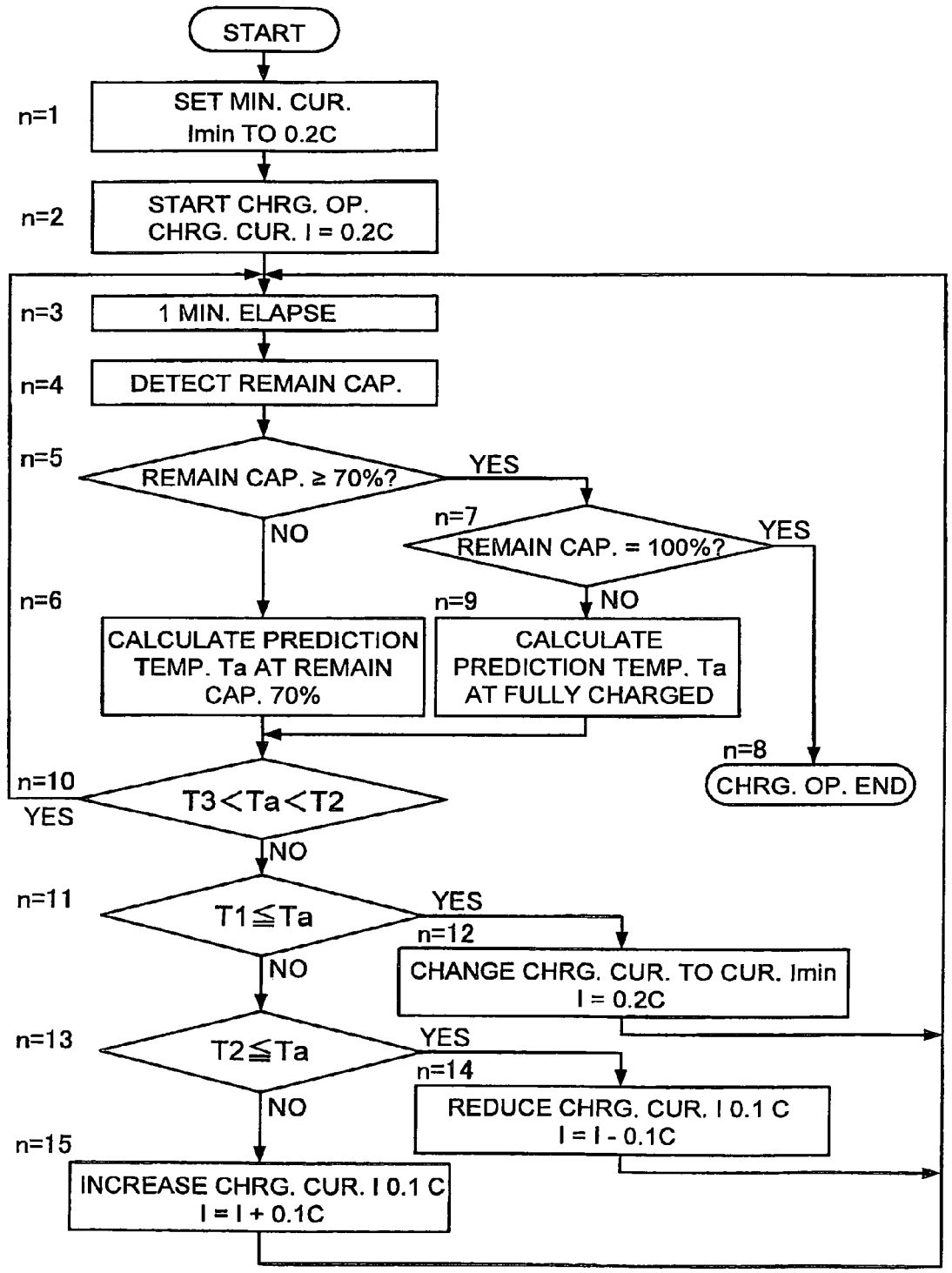
FIG. 4 is a flowchart showing the charging method according to the embodiment of the present invention.

In the aforementioned charging method, the battery is charged in a manner shown in a flowchart of FIG. 4.
(Steps n=1 and 2)
A minimum current $I_{min}$ is set to 0.2 C. Charging operation starts in the state where a charging current I is 0.2 C as the minimum current $I_{min}$.
(Steps n=3 and 4)
After 1 minute, a remaining capacity of the battery is detected.
(Steps n=5 and 6)
It is determined whether the battery is charged to a remaining capacity of 70% as the first predetermined capacity. If the battery is not charged to a remaining capacity of 70%, the procedure goes to Step n=6, and a prediction temperature Ta when the battery will be charged to 70% is calculated based on a temperature rise gradient of the battery.
(Steps n=7 to 9)
If a remaining capacity of the battery is not less than 70%, the procedure goes to Step n=7, and it is determined whether the battery is charged to the fully-charged capacity as the second predetermined capacity. If the battery is fully charged, the procedure goes to Step n=8 and the charging operation ends. If the battery is not fully charged, the procedure goes to Step n=9, and a prediction temperature Ta when the battery will be fully charged is calculated based on a temperature rise gradient of the battery.
(Step n=10)
It is determined whether the prediction temperature Ta of the battery falls within a range between the second predetermined temperature T2 and the third predetermined temperature T3, in other words, whether the prediction temperature Ta falls within the third, temperature range.

If the prediction temperature Ta falls within the third temperature range, the procedure returns to Step n=3, and the charging operation is continued without changing the charging current I.
(Steps n=11 and 12)
If the prediction temperature Ta does not fall within the third temperature range, in Step n=11 it is determined whether the prediction temperature Ta of the battery is not lower than the first predetermined temperature T1, in other words, whether the prediction temperature Ta falls within the first temperature range.

If the prediction temperature Ta falls within the first temperature range, the procedure goes to Step n=12, and the charging current I is changed to 0.2 C as the minimum current Imin. After that, the procedure returns to Step n=3, and the charging operation is continued at the changed charging current I.

(Steps n=13 to 15)

If the prediction temperature Ta does not fall within the first temperature range, the procedure goes to Step n=13, and it is determined whether the prediction temperature Ta of the battery is not lower than the second predetermined temperature T2.

If the prediction temperature Ta is not lower than the second predetermined temperature T2, since it is already determined in Step n=11 that the prediction temperature Ta is lower than the first predetermined temperature T1, it is determined that the prediction temperature Ta falls within the second temperature range, and the procedure goes to Step n=14 so that the charging current I is reduced 0.1 C. After that, the procedure returns to Step n=3, and the charging operation is continued at the changed charging current I.

If the prediction temperature Ta is lower than the second predetermined temperature T2, since it is already determined in Step of n=10 that the prediction temperature Ta is lower than the third predetermined temperature T3, it is determined that the prediction temperature Ta falls within the fourth temperature range, and the procedure goes to Step n=15 so that the charging current I is increased 0.1 C. After that, the procedure returns to Step n=3, and the charging operation is continued at the changed charging current I.

In this embodiment, the charging operation is conducted in the state where the battery is charged at a constant voltage and a constant current. Under this charging operation, in the case where the charging operation is conducted in a constant-voltage charging range, the battery is charged in a manner as described in the aforementioned flow. However, according to the charge' characteristic of a battery itself, in the case where the battery is required to be charged in the constant-voltage charging range at a charging current lower than the current value described in the aforementioned flow, the charging operation can be conducted at this lower current value.

Figure 1:
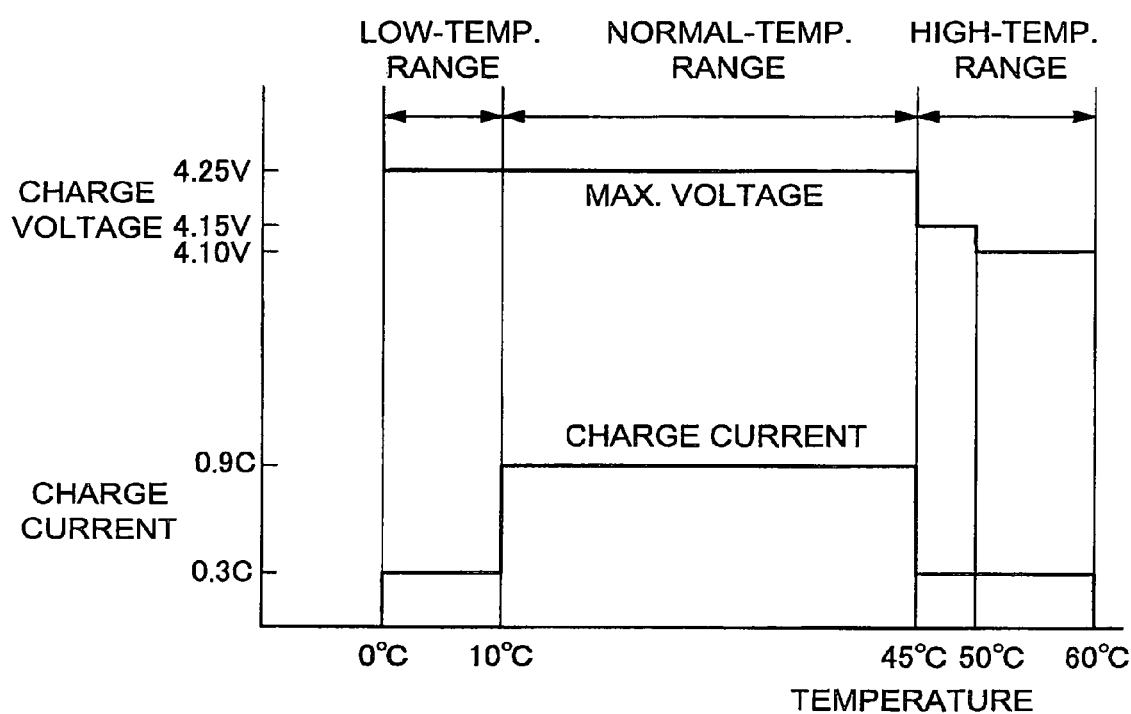
FIG. 1 is a graph showing an exemplary relationship of charging current and maximum voltage to temperature of lithium-ion rechargeable battery.

In this embodiment, in order to charge the battery at a current that brings a battery temperature lower than the predetermined temperature, a battery temperature at the first predetermined capacity (70%) is predicted (first charging step), and in addition to this a battery temperature at the second predetermined capacity (100%) is predicted (second charging step). In the constant-voltage and constant-current charging operation, the first predetermined capacity (70%) is a rough value in that the operation shifts from a constant current charging operation to a constant voltage charging operation. In the constant voltage charging operation, a charging current gradually decreases. Accordingly, the battery temperature is less likely to rise. However, a capacity in that the operation shifts from the constant current charging operation to the constant voltage charging operation is affected by temperature, battery deterioration and the like, and is not fixed. For this reason, even in the case where the battery is charged to the first predetermined capacity (70%) or higher, the constant current charging operation may be conducted. In this case, or due to other reason, the battery temperature will rise. As shown in FIG. 1, if a battery temperature rises from the normal temperature range to the high temperature range, charging voltage and current in the high temperature range are lower than in the normal temperature range. For this reason, there are problems in that a completed charged amount of the battery is low, or charging operation time is increased. In the case of a charging circuit that cannot reduce a charging voltage, there is a problem in that the charging circuit stops the charging operation and as a result a completed charged amount of the battery is low. Contrary to this, in this embodiment, in the case where the battery is charged to the first predetermined capacity (70%) or higher, even in the case where the constant current charging operation is conducted, a battery temperature at the second predetermined capacity (100%) is predicted, and a charging current is controlled based on the predicted battery temperature (second charging step). Accordingly, the aforementioned problems can be solved. Therefore, a completed charged amount of the battery can be high, and charging operation time can be short.

Figure 5:
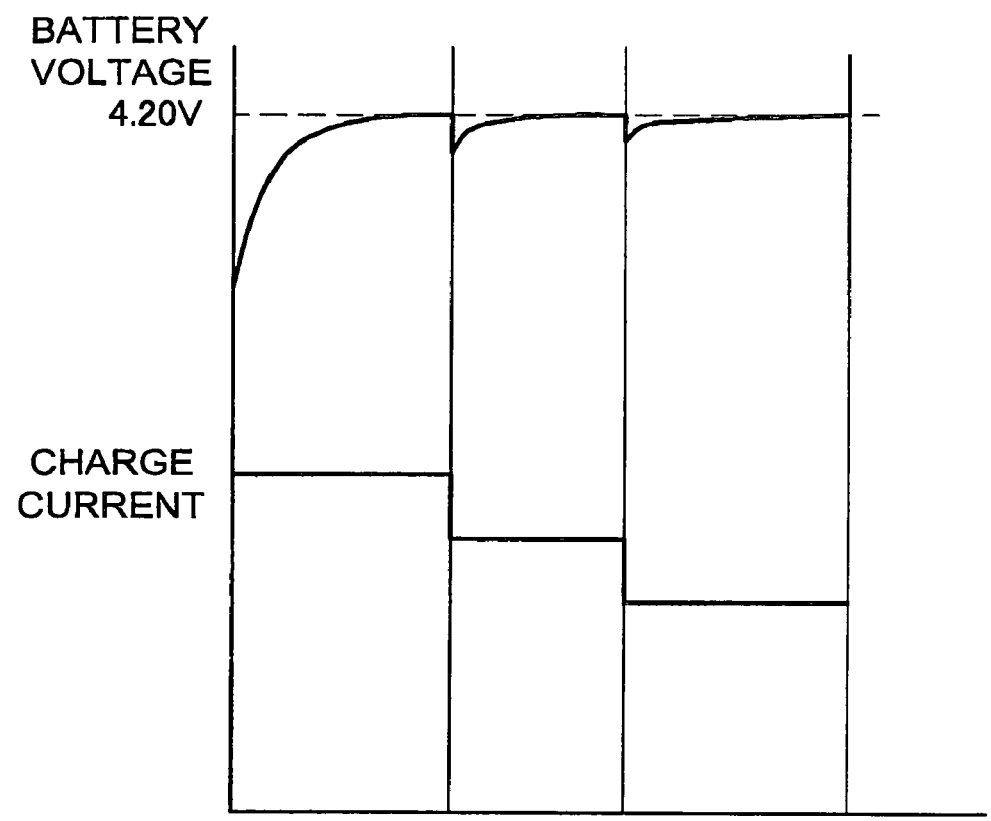
FIG. 5 is a graph showing the state where an arithmetic circuit controls a charging current based on a battery voltage.

Additionally, the arithmetic circuit 12 detects a voltage of the battery 11, and controls a charging current based on a comparison of this detection voltage with a predetermined value. FIG. 5 is a graph showing the state where the arithmetic circuit 12 controls a charging current based on a battery voltage. The arithmetic circuit 12 that controls a current in a manner shown in this figure reduces a charging current when a voltage of the battery 11 reaches a predetermined voltage (for example, the predetermined voltage is 4.20 V, or can be 4.25 V or lower in the normal temperature range of FIG. 1). When a cell voltage of the battery 11 (the maximum battery voltage in the case where the battery is composed of a plurality of serially-connected batteries) exceeds the predetermined voltage, the arithmetic circuit 12 provides a current reduction signal for reducing a current to the current regulating circuit 23 of the charger unit 20 through a communication terminal 18. The current regulating circuit 23 of the charger unit 20 reduces a charging current in response to this current reduction signal. However, the current regulating circuits 23 have delay time to reduce a charging current even when the battery pack 10 provides the current reduction signal. In this delay time, a current of the battery 11 is not reduced, and thus a voltage of the battery 11 increases. If a battery voltage exceeds a maximum limit voltage, the battery charging operation stops. Accordingly, if a battery voltage exceeds the maximum limit voltage within this delay time, the charging operation will stop. Also, in order to prevent this problem, the arithmetic circuit 12 has a function that turns a charging switch (not shown) OFF to temporarily stop a charging operation until the current regulating circuit 23 reduces the charging current. Therefore, it is possible prevent a battery voltage from exceeding the maximum limit voltage within the delay time. In order to prevent the charging operation stop, the arithmetic circuit 12 can have a cancellation circuit 19 that temporarily stops detecting a voltage of the battery 11 in the delay time or stops providing the signal for stopping the charging operation in the delay time irrespective of voltage detection.

A charging current of the battery is controlled based on both a prediction temperature and a battery voltage. A charging current is controlled and adjusted to a lower current value of current values that are determined based on the prediction temperature and the battery voltage.

Figure 6:
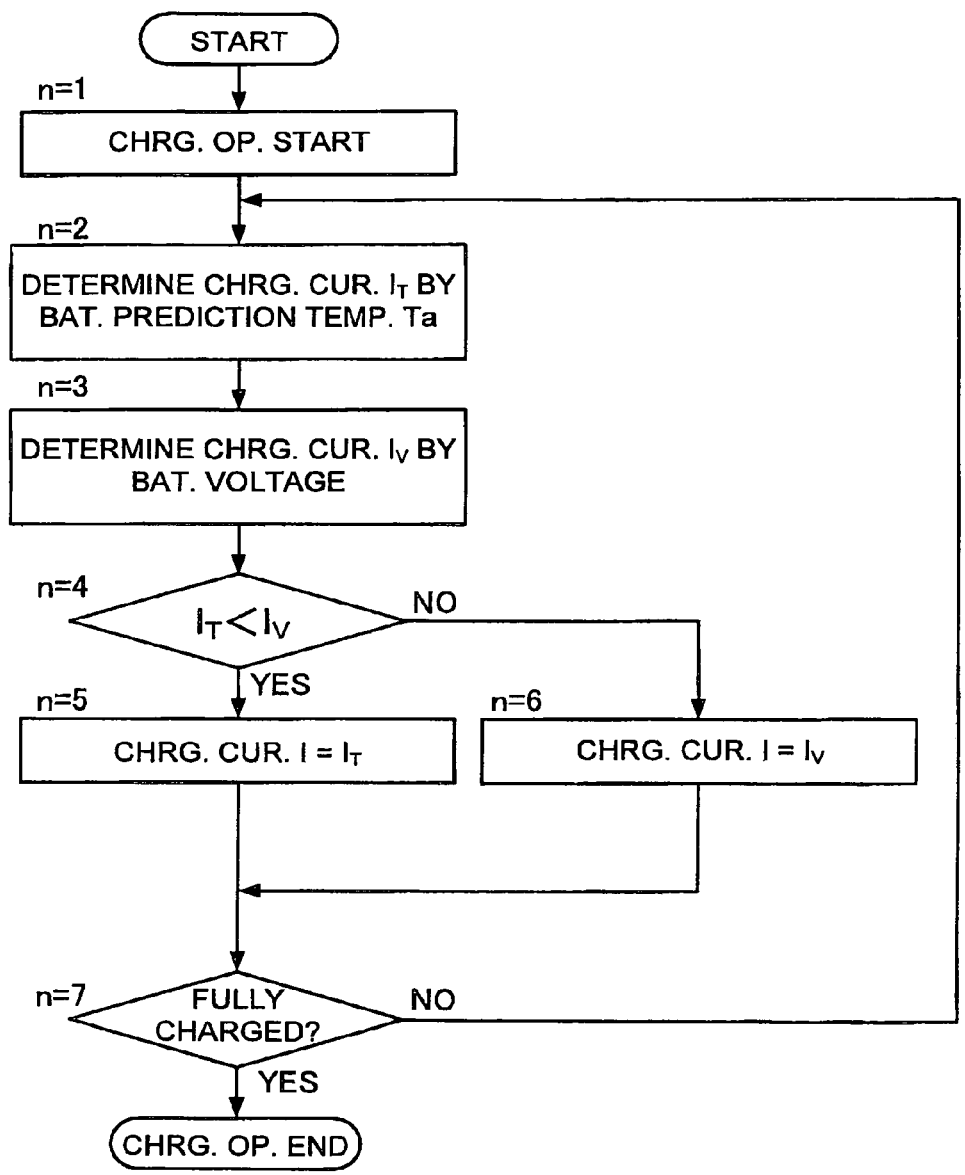
FIG. 6 is a flowchart showing a charging method according to another embodiment of the present invention.

In this charging method, the battery is charged in a manner shown in a flowchart of FIG. 6.

(Step n=1)

Charging operation starts.

(Step n=2)

The arithmetic circuit 12 determines a charging current $I_T$ based on a prediction battery temperature Ta. As discussed above, a temperature rise gradient of the battery is detected at a current that charges the battery, and a temperature of the battery is predicted based on this temperature rise gradient when where the battery will be charged to a predetermined capacity. A charging current $I_T$ is determined so that a prediction temperature Ta may be lower than a predetermined temperature.

(Step n=3)

The arithmetic circuit 12 determines a charging current $I_v$ based on a battery voltage. The charging current $I_v$ is determined to be reduced when a voltage of the battery increases to the predetermined voltage so that a battery voltage may not exceed the predetermined voltage.

(Steps n=4 to 6)

The charging current $I_v$ that is determined based on a battery voltage is compared with the charging current $I_T$ that is determined based on a prediction temperature Ta. The battery is charged at a lower current value of the charging current $I_T$ and the charging current $I_v$ as a charging current I.

(Step n=7)

It is determined whether the battery is fully charged. If the battery is not fully charged, the procedure returns to Step n=2, and the charging operation is continued. If the battery is fully charged, the procedure goes to Step n=8, and the charging operation ends.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2007-321,374 filed in Japan on Dec. 12, 2007, the content of which is incorporated herein by reference.

What is claimed is:

1. A constant-voltage and constant-current lithium-ion rechargeable battery charging method comprising:

a first charging step of detecting, at a current that is currently applied to a battery to be charged, a temperature rise gradient of the battery, predicting a battery temperature when the battery will be charged to a first predetermined capacity based on the detected temperature rise gradient, controlling a charging current based on the predicted temperature, and charging the battery to the first predetermined capacity at a current that results in a temperature of the battery that is lower than a predetermined temperature; and, after the battery is charged to the first predetermined capacity, a second charging step of detecting, at a current that is currently applied to the battery to be charged, a temperature rise gradient of the battery, predicting a battery temperature when the battery will be charged to a second predetermined capacity based on the temperature rise gradient, controlling a charging current based on the predicted temperature, and charging the battery to the second predetermined capacity at a current that results in a temperature of the battery that is lower than the predetermined temperature at the second predetermined capacity, wherein the second predetermined capacity is higher than the first predetermined capacity, wherein, during the charging of the battery to the first predetermined capacity in the first charging step, the battery temperature is predicted as the battery temperature at the first predetermined capacity on the condition that the battery will be charged to the first predetermined capacity, and wherein, during the charging of the battery from the first predetermined capacity to the second predetermined capacity in the second charging step, the battery temperature is predicted as the battery temperature at the second predetermined capacity on the condition that the battery will be charged to the second predetermined capacity.

2. The charging method according to claim 1, wherein first, second and third predetermined temperatures T1, T2 and T3 that decrease in this order are stored, and a temperature zone in that a charging current of the battery is controlled is divided into first, second, third and fourth temperature ranges, wherein the first temperature range is a range higher than the first predetermined temperature T1, the second temperature range is a range between the first and second predetermined temperatures T1 and T2, the third temperature range is a range between the second and third predetermined temperatures T2 and T3, and the fourth temperature is a range lower than the third predetermined temperature T3, wherein if the prediction temperature of the battery to be charged falls within the first temperature range, a charging current is set to the minimum current, if the prediction temperature of the battery to be charged falls within the second temperature range, a charging current is reduced a predetermined amount, if the prediction temperature of the battery to be charged falls within the third temperature range, the battery is charged without changing a charging current, and if the prediction temperature of the battery to be charged falls within the fourth temperature range, a charging current is increased a predetermined amount.

3. The charging method according to claim 1, wherein the predetermined temperature is stored, wherein if a battery temperature is higher than the predetermined temperature, a current for charging the battery is reduced, and if a battery temperature is lower than the predetermined temperature, a current for charging the battery is increased.

4. The charging method according to claim 3, wherein as the temperature difference between the predetermined temperature and the prediction temperature increases, a charging current is controlled by changing the amount of current to be reduced or increased.

5. The charging method according to claim 1, wherein the first predetermined capacity is a capacity in a range of 60% to 90% of the fully-charged capacity.

6. The charging method according to claim 1, wherein the second predetermined capacity is the fully-charged capacity.

7. The charging method according to claim 1, wherein the predetermined temperature is a temperature in a range of 40° to 45° C.

8. The charging method according to claim 1, wherein in the first charging step, a charging current for charging the battery is increased based on the detected temperature rise gradient.

9. The charging method according to claim 1, wherein in the first charging step, the battery is charged at a constant current, and in the second charging step the battery is charged at a constant voltage.

10. The charging method according to claim 1, wherein a voltage of the battery is detected, and a charging-current is controlled based on the detected voltage, wherein if a voltage of the battery increases to a predetermined voltage, a charging current for charging the battery is reduced.

11. The charging method according to claim 10, wherein in the step in that a voltage of the battery is detected, a charging current is controlled based on the detected voltage, in that, if a voltage of the battery increases to a predetermined voltage, a charging current for charging the battery is reduced, and in that, after a voltage of the battery increases to the predetermined voltage, a charging current is reduced, detection of a voltage of the battery is stopped in a predetermined period after it is detected that a battery voltage Increases to the predetermined voltage.

12. The charging method according to claim 10, wherein in the step in that a voltage of the battery is detected, a charging current is controlled based on the detected voltage, in that, if a voltage of the battery increases to a predetermined voltage, a charging current for charging the battery is reduced, the battery temporarily stops being charged at the timing where a charging current is reduced.

13. The charging method according to claim 1, wherein a voltage of the battery is detected, and a charging current is controlled based on the detected voltage, wherein if a voltage of the battery increases to a predetermined voltage value, a charging current is reduced, wherein the battery is charged at smaller one of a charging current that is controlled based on the detected voltage, and a charging current that is controlled based on the prediction temperature.

* * * * *